Figure 1:
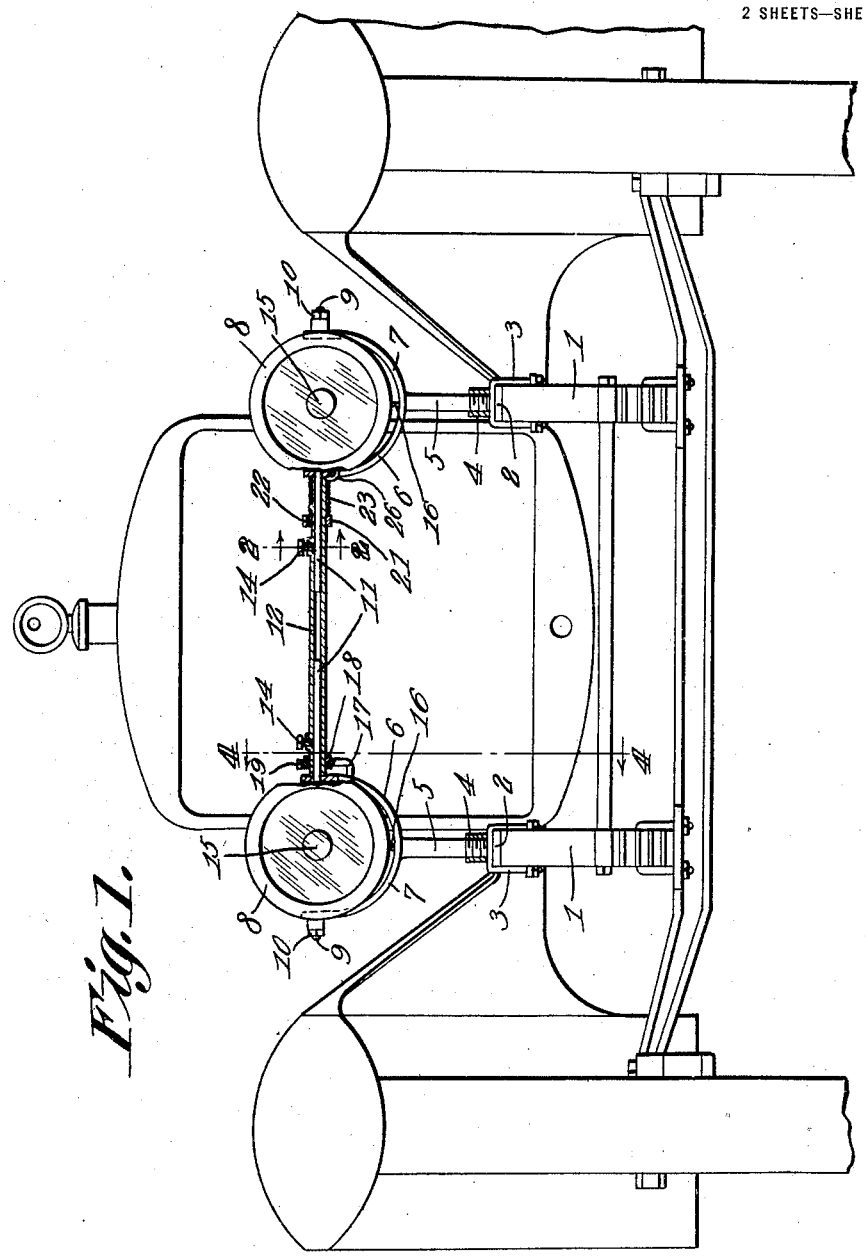

W. A. RUTHERFORD.
DIRIGIBLE HEADLIGHT.
APPLICATION FILED JAN. 31, 1921.

1,395,147.

Patented Oct. 25, 1921.
2 SHEETS—SHEET 1.

Inventor,
W. A. Rutherford,
By C. A. Snow & Co.
Attorneys

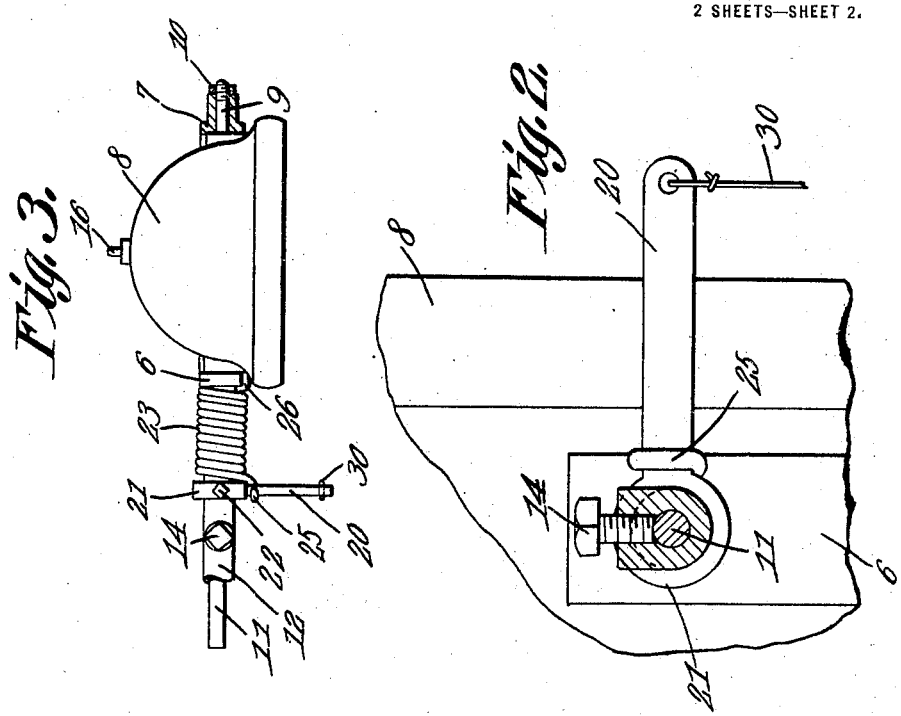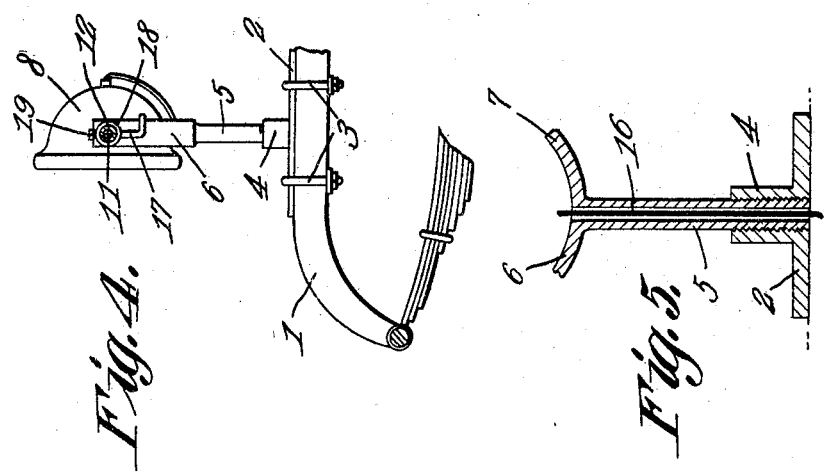

UNITED STATES PATENT OFFICE.

WILLIAM A. RUTHERFORD, OF SALEM, OREGON.

DIRIGIBLE HEADLIGHT.

1,395,147.　　　Specification of Letters Patent.　　Patented Oct. 25, 1921.

Application filed January 31, 1921. Serial No. 441,326.

*To all whom it may concern:*

Be it known that I, WILLIAM A. RUTHERFORD, a citizen of the United States, residing at Salem, in the county of Marion and State of Oregon, have invented a new and useful Dirigible Headlight, of which the following is a specification.

This invention aims to provide novel means whereby the driver of an automobile may direct the light from his headlamps toward the ground, either for the purpose of avoiding the blinding of the pedestrians or approaching drivers, or to the end that some part of the road in advance, not illuminated ordinarily, may be lighted up at the will of an operator.

It is within the province of the disclosure to improve generally and to enhance the utility of devices of that type to which the invention appertains.

I do not bind myself to the specific form shown and described, since, within the scope of what is claimed, a mechanic may make changes without departing from the spirit of the invention.

In the drawings:—Figure 1 shows in front elevation, a motor vehicle whereunto the device forming the subject matter of this application has been applied, parts appearing in section; Fig. 2 is a cross section on the line 2—2 of Fig. 1; Fig. 3 is a fragmental top plan showing one of the lamps and attendant parts; Fig. 4 is a section on the line 4—4 of Fig. 1; Fig. 5 is a vertical section taken through one of the lamp standards.

On the chassis bars 1 of a motor vehicle, foot plates 2 are secured by clamps 3. The plates 2 have sockets 4 wherein tubular standards 5 are mounted, each standard having an inner arm 6 and an outer arm 7. The standards 5 and the arms 6 and 7 constitute supports for lamps 8. If the lamps 8 are lighted electrically, the conductors 16 which lead to the bulbs 15 in the lamps, may be run upwardly through the standards 5, as shown in Fig. 5. Each lamp 8 has a spindle 9 journaled in the arm 7, and a shaft 11 journaled in the arm 6, nuts 10 being mounted on the spindles 9, if considered expedient.

The shafts 11 of the lamps 8 are rotatable for adjustment in a tubular connector 12, and the shafts, together with the connector, may be alluded to as means for connecting the lamps. Although the shafts 11 are rotatable for adjustment in the connector 12, the shafts and the connector ordinarily are held together rigidly by set screws 14 threaded into the connector and bearing on the shafts. The numeral 17 denotes an angular finger engaged with the arm 6 of one lamp support, the finger having a head or ring 18 surrounding the connector 12 and constituting means whereby the finger may be adjusted circumferentially of the adjuster. A set screw 19 is threaded into the ring 18 and engages the part 12 to hold the finger 17 in any position to which it may have been adjusted.

A torsion spring 23 surrounds a portion of the connector 12, one end 26 of the spring being engaged with one of the arms 6, the other end 25 of the spring being engaged with an operating member, which may be in the form of a lever 20, actuated by any suitable means 30. The lever 30 has a socket 21 mounted on the connector 12, a set screw 22 being threaded into the socket and engaging the member 12.

The spring 23 rotates the connector 12 until the finger 17 engages one of the arms 6, the lamps 8 thus being held in normal position. When the driver wishes to move the lamps 8 so that the rays proceeding therefrom may be directed toward the ground, the connector 12 is rotated by means of the lever 20 or its equivalent, movement being imparted to the lamps simultaneously by way of the lamp shafts 11.

The lever 20 may be adjusted circumferentially of the part 12, either to adapt the lever to any mechanism, not specifically shown, for operating the lever from the driver's seat of the vehicle, or to put the spring 23 under torsion. The finger 17 may be adjusted circumferentially of the part 12, to the end that the line of projection of the lamps 8 with respect to the horizontal may be varied. Owing to the fact that the lamp shafts 11 are independently rotatable in the part 12, the lamps may be so set that the lines of projection of the lamps may be parallel.

What is claimed is:—

In a device of the class described, supports; lamps mounted to swing on the supports and having shafts; a connector wherewith the shafts are rotatably assembled, to permit an adjustment of each lamp; means for securing the connector to each shaft releasably; a lever adjustable on the connector circumferentially thereof; means for holding the lever in adjusted positions on the connector circumferentially thereof; a torsion spring engaged at its ends with the lever and with one support; a stop finger coöperating with one support under the action of the spring, the stop finger being adjustable circumferentially of the connector; and means for holding the stop finger in adjusted positions circumferentially of the connector.

In testimony that I claim the foregoing as my own, I have hereto affixed my signature in the presence of two witnesses.

WILLIAM A. RUTHERFORD.

Witnesses:
HENRY E. MORRIS,
P. J. KUNTZ.